US011955131B2

(12) United States Patent
Dick et al.

(10) Patent No.: US 11,955,131 B2
(45) **Date of Patent: *Apr. 9, 2024**

(54) APPARATUS AND METHOD FOR ENCODING OR DECODING A MULTI-CHANNEL SIGNAL

(71) Applicant: Fraunhofer-Gesellschaft zur Foerderung der angewandten Forschung e.V., Munich (DE)

(72) Inventors: Sascha Dick, Nuremberg (DE); Florian Schuh, Zirndorf (DE); Nikolaus Rettelbach, Nuremberg (DE); Tobias Schwegler, Nuremberg (DE); Richard Fueg, Nuremberg (DE); Johannes Hilpert, Nuremberg (DE); Matthias Neusinger, Rohr (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,583

(22) Filed: Oct. 18, 2022

(65) Prior Publication Data

US 2023/0134993 A1 May 4, 2023

Related U.S. Application Data

(60) Continuation of application No. 16/995,537, filed on Aug. 17, 2020, now Pat. No. 11,508,384, which is a
(Continued)

(30) Foreign Application Priority Data

Mar. 9, 2015 (EP) .................................... 15158234
Jun. 17, 2015 (EP) .................................... 15172492

(51) Int. Cl.
*G10L 19/008* (2013.01)
*G10L 19/02* (2013.01)
*H04S 3/00* (2006.01)

(52) U.S. Cl.
CPC ............ *G10L 19/008* (2013.01); *G10L 19/02* (2013.01); *H04S 3/008* (2013.01); *H04S 2400/01* (2013.01)

(58) Field of Classification Search
None
See application file for complete search history.

(56) References Cited

U.S. PATENT DOCUMENTS 8,295,494 B2 10/2012 Oh et al.
8,731,204 B2 5/2014 Sperschneider et al.
(Continued)

FOREIGN PATENT DOCUMENTS

CN 101529501 A 9/2009
CN 101930742 A 12/2010
(Continued)

OTHER PUBLICATIONS

"Information technology—MPEG audio technologies—Part 1: MPEG Sound", ISO/IEC 23003-1:2007(E), Feb. 15, 2007, pp. 1-288.
(Continued)

*Primary Examiner* — Qin Zhu
(74) *Attorney, Agent, or Firm* — Perkins Coie LLP; Michael A. Glenn

(57) ABSTRACT

An apparatus for encoding a multi-channel signal having at least three channels includes an iteration processor, a channel encoder and an output interface. The iteration processor is configured to calculate inter-channel correlation values between each pair of the at least three channels, for selecting a pair including a highest value or including a value above a threshold, and for processing the selected pair using a
(Continued)

multi-channel processing operation to derive first multi-channel parameters for the selected pair and to derive first processed channels. The iteration processor is configured to perform the calculating, the selecting and the processing using at least one of the processed channels to derive second multi-channel parameters and second processed channels. The channel encoder is configured to encode channels resulting from an iteration processing to obtain encoded channels. The output interface is configured to generate an encoded multi-channel signal including the encoded channels and the first and second multi-channel parameters.

27 Claims, 6 Drawing Sheets

Related U.S. Application Data continuation of application No. 16/413,299, filed on May 15, 2019, now Pat. No. 10,762,909, which is a division of application No. 15/696,861, filed on Sep. 6, 2017, now Pat. No. 10,388,289, which is a continuation of application No. PCT/EP2016/054900, filed on Mar. 8, 2016.

(56) References Cited

U.S. PATENT DOCUMENTS

| | | | |
|---|---|---|---|
| 8,989,881 | B2 | 3/2015 | Popp et al. |
| 9,105,264 | B2 | 8/2015 | Ishikawa et al. |
| 9,154,896 | B2 | 10/2015 | Mahabub et al. |
| 9,659,569 | B2 | 5/2017 | Vasilache et al. |
| 10,388,289 | B2 | 8/2019 | Dick et al. |
| 10,448,185 | B2 | 10/2019 | Disch et al. |
| 2004/0049379 | A1 | 3/2004 | Thumpudi et al. |
| 2005/0074127 | A1 | 4/2005 | Herre et al. |
| 2006/0233380 | A1 | 10/2006 | Holzer et al. |
| 2006/0246868 | A1 | 11/2006 | Taleb et al. |
| 2007/0071247 | A1 | 3/2007 | Pang et al. |
| 2007/0121954 | A1 | 5/2007 | Kim et al. |
| 2007/0219808 | A1 | 9/2007 | Herre et al. |
| 2008/0002842 | A1 | 1/2008 | Neusinger et al. |
| 2008/0015867 | A1 | 1/2008 | Kraemer |
| 2008/0262854 | A1 | 10/2008 | Jung et al. |
| 2009/0083045 | A1 | 3/2009 | Briand et al. |
| 2009/0112606 | A1 | 4/2009 | Mehrotra et al. |
| 2009/0125314 | A1 | 5/2009 | Hellmuth et al. |
| 2010/0322429 | A1 | 12/2010 | Norvell et al. |
| 2011/0022402 | A1 | 1/2011 | Engdegard et al. |
| 2011/0224993 | A1 | 9/2011 | Kim et al. |
| 2012/0057715 | A1 | 3/2012 | Johnston et al. |
| 2012/0259622 | A1 | 10/2012 | Liu et al. |
| 2012/0259642 | A1 | 10/2012 | Takada et al. |
| 2013/0030819 | A1 | 1/2013 | Purnhagen et al. |
| 2013/0077793 | A1 | 3/2013 | Moon et al. |
| 2013/0279702 | A1 | 10/2013 | Lang et al. |
| 2015/0131799 | A1 | 5/2015 | Kim et al. |
| 2015/0221314 | A1 | 8/2015 | Disch et al. |
| 2015/0279377 | A1 | 10/2015 | Disch et al. |
| 2015/0380002 | A1 | 12/2015 | Uhle et al. |
| 2016/0217797 | A1 | 7/2016 | Kjoerling et al. |
| 2017/0134873 | A1 | 5/2017 | Beack et al. |

FOREIGN PATENT DOCUMENTS

| | | | |
|---|---|---|---|
| CN | 103262158 | A | 8/2013 |
| EP | 2541546 | A1 | 1/2013 |
| JP | H07160292 | A | 6/1995 |
| JP | 2004246224 | A | 9/2004 |
| JP | 2006323314 | A | 11/2006 |
| JP | 2008503767 | A | 2/2008 |
| JP | 2008511848 | A | 4/2008 |
| JP | 2008129250 | A | 6/2008 |
| JP | 2008535014 | A | 8/2008 |
| JP | 2009530652 | A | 8/2009 |
| JP | 2011501544 | A | 1/2011 |
| JP | 2015011076 | A | 1/2015 |
| JP | 6600004 | B2 | 10/2019 |
| RU | 2367033 | C2 | 9/2009 |
| TW | 201419266 | A | 5/2014 |
| TW | 201423729 | A | 6/2014 |
| TW | 201444383 | A | 11/2014 |
| WO | 2002023528 | A1 | 3/2002 |
| WO | 2007004831 | A1 | 1/2007 |
| WO | 2007010451 | A1 | 1/2007 |
| WO | 2010087630 | A2 | 8/2010 |
| WO | 2011080916 | A1 | 7/2011 |

OTHER PUBLICATIONS

"Information technology—MPEG audio technologies—Part 3: Unified speech and audio coding", ISO/IEC FDIS 23003-3:2011(E); ISO/IEC JTC 1/SC 29/WG 11; STD Version 2.1c2, 2011, 286 pp.

Breebaart, J, et al., "MPEG Spatial Audio Coding/MPEG Surround: Overview and Current Status", Audio Engineering Society Convention Paper presented at the 119th Convention, 17 pp.

Dong, Shi, et al., "Three-channel dependent mid/side coding framework for multichannel 3D audio", Journal on Communications, vol. 35, No. 6, 6 pp.

ETSI TS 103 190 V1.1.1 (Apr. 2014), "Digital Audio Compression (AC-4) Standard", Technical Specification, EBU, Operating Eurovision, Apr. 2014, pp. 1-295.

Yang, Dai, et al., "Adaptive Karhunen-Loeve Transform for Enhanced Multichannel Audio Coding", http://ict.usc.edu/pubs/Adaptive%20Karhunen-Loeve%20Transform%20for%20Enhanced%20Multichannel%20Audio%20Coding.pdf, 12 pp.

APPARATUS AND METHOD FOR ENCODING OR DECODING A MULTI-CHANNEL SIGNAL

CROSS-REFERENCE TO RELATED APPLICATIONS

This application is a continuation of copending U.S. patent application Ser. No. 16/995,537 filed Aug. 17, 2020, which is a continuation of U.S. patent application Ser. No. 16/413,299, filed on May 15, 2019, which in turn is a divisional of U.S. patent application Ser. No. 15/696,861, filed on Sep. 6, 2017, which in turn is a continuation of copending International Application No. PCT/EP2016/054900, filed Mar. 8, 2016, which is incorporated herein by reference in its entirety, and additionally claims priority from European Applications Nos. EP 15158234.3, filed Mar. 9, 2015, and EP 15172492.9, filed Jun. 17, 2015, all of which are incorporated herein by reference in their entirety.

The present invention relates to audio coding/decoding and, in particular, to audio coding exploiting inter-channel signal dependencies.

BACKGROUND OF THE INVENTION

Audio coding is the domain of compression that deals with exploiting redundancy and irrelevancy in audio signals. In MPEG USAC [ISO/IEC 23003-3:2012—Information technology—MPEG audio technologies Part 3: Unified speech and audio coding], joint stereo coding of two channels is performed using complex prediction, MPS 2-1-2 or unified stereo with band-limited or full-band residual signals. MPEG surround [ISO/IEC 23003-1:2007—Information technology—MPEG audio technologies Part 1: MPEG Surround] hierarchically combines OTT and TTT boxes for joint coding of multi-channel audio with or without transmission of residual signals. MPEG-H Quad Channel Elements hierarchically apply MPS 2-1-2 stereo boxes followed by complex prediction/MS stereo boxes building a fixed 4×4 remixing tree. AC4 [ETSI TS 103 190 V1.1.1 (2014-04)—Digital Audio Compression (AC-4) Standard] introduces new 3-, 4- and 5-channel elements that allow for remixing transmitted channels via a transmitted mix matrix and subsequent joint stereo coding information. Further, prior publications suggest to use orthogonal transforms like Karhunen-Loeve Transform (KLT) for enhanced multi-channel audio coding [Yang, Dai and Ai, Hongmei and Kyriakakis, Chris and Kuo, C.-C. Jay, 2001: Adaptive Karhunen-Loeve Transform for Enhanced Multichannel Audio Coding, http://ict.usc.edu/pubs/Adaptive%20Karhunen-Loeve%20Transform%20for%20Enhanced%20Multichannel%20Audio%20Coding.pdf].

In the 3D audio context, loudspeaker channels are distributed in several height layers, resulting in horizontal and vertical channel pairs. Joint coding of only two channels as defined in USAC is not sufficient to consider the spatial and perceptual relations between channels. MPEG Surround is applied in an additional pre-/postprocessing step, residual signals are transmitted individually without the possibility of joint stereo coding, e.g. to exploit dependencies between left and right vertical residual signals. In AC-4 dedicated N-channel elements are introduced that allow for efficient encoding of joint coding parameters, but fail for generic speaker setups with more channels as proposed for new immersive playback scenarios (7.1+4, 22.2). MPEG-H Quad Channel element is also restricted to only 4 channels and cannot be dynamically applied to arbitrary channels but only a pre-configured and fixed number of channels.

SUMMARY

An embodiment may have an apparatus for encoding a multi-channel signal having at least three channels, having: an iteration processor for calculating, in a first iteration step, inter-channel correlation values between each pair of the at least three channels, for selecting, in the first iteration step, a pair having a highest value or having a value above a threshold, and for processing the selected pair using a multichannel processing operation to derive first multichannel parameters for the selected pair and to derive first processed channels, wherein the iteration processor is configured to perform the calculating, the selecting and the processing in a second iteration step using at least one of the processed channels to derive second multichannel parameters and second processed channels; a channel encoder for encoding channels resulting from an iteration processing performed by the iteration processor to acquire encoded channels; and an output interface for generating an encoded multi-channel signal having the encoded channels and the first and the second multichannel parameters.

Another embodiment may have an apparatus for decoding an encoded multi-channel signal having encoded channels and at least first and second multichannel parameters, having: a channel decoder for decoding the encoded channels to acquire decoded channels; and a multichannel processor for performing a multichannel processing using a second pair of the decoded channels identified by the second multichannel parameters and using the second multichannel parameters to acquire processed channels, and for performing a further multichannel processing using a first pair of channels identified by the first multichannel parameters and using the first multichannel parameters, wherein the first pair of channels has at least one processed channel.

Another embodiment may have a method for encoding a multi-channel signal having at least three channels, having the steps of: Calculating, in a first iteration step, inter-channel correlation values between each pair of the at least three channels, selecting, in the first iteration step, a pair having a highest value or having a value above a threshold, and processing the selected pair using a multichannel processing operation to derive first multichannel parameters for the selected pair and to derive first processed channels, Performing the calculating, the selecting and the processing in a second iteration step using at least one of the processed channels to derive second multichannel parameters and second processed channels; Encoding channels resulting from an iteration processing performed by the iteration processor to acquire encoded channels; and generating an encoded multi-channel signal having the encoded channels and the first and the second multichannel parameters.

Another embodiment may have a method of decoding an encoded multi-channel signal having encoded channels and at least first and second multichannel parameters, having the steps of: decoding the encoded channels to acquire decoded channels; and performing a multichannel processing using a second pair of the decoded channels identified by the second multichannel parameters and using the second multichannel parameters to acquire processed channels, and performing a further multichannel processing using a first pair of channels identified by the first multichannel parameters and using the first multichannel parameters, wherein the first pair of channels has at least one processed channel.

Another embodiment may have a non-transitory digital storage medium having a computer program stored thereon to perform the method for encoding a multi-channel signal having at least three channels, having the steps of: Calculating, in a first iteration step, inter-channel correlation values between each pair of the at least three channels, selecting, in the first iteration step, a pair having a highest value or having a value above a threshold, and processing the selected pair using a multichannel processing operation to derive first multichannel parameters for the selected pair and to derive first processed channels, Performing the calculating, the selecting and the processing in a second iteration step using at least one of the processed channels to derive second multichannel parameters and second processed channels; Encoding channels resulting from an iteration processing performed by the iteration processor to acquire encoded channels; and generating an encoded multi-channel signal having the encoded channels and the first and the second multichannel parameters, when said computer program is run by a computer.

Another embodiment may have a non-transitory digital storage medium having a computer program stored thereon to perform the method of decoding an encoded multi-channel signal having encoded channels and at least first and second multichannel parameters, having the steps of: decoding the encoded channels to acquire decoded channels; and performing a multichannel processing using a second pair of the decoded channels identified by the second multichannel parameters and using the second multichannel parameters to acquire processed channels, and performing a further multichannel processing using a first pair of channels identified by the first multichannel parameters and using the first multichannel parameters, wherein the first pair of channels has at least one processed channel, when said computer program is run by a computer.

Embodiments provide an apparatus for encoding a multi-channel signal having at least three channels. The apparatus comprises an iteration processor, a channel encoder and an output interface. The iteration processor is configured to calculate, in a first iteration step, inter-channel correlation values between each pair of the at least three channels, for selecting, in the first iteration step, a pair having a highest value or having a value above a threshold, and for processing the selected pair using a multi-channel processing operation to derive first multi-channel parameters for the selected pair and to derive first processed channels. Further, the iteration processor is configured to perform the calculating, the selecting and the processing in a second iteration step using at least one of the processed channels to derive second multi-channel parameters and second processed channels. The channel encoder is configured to encode channels resulting from an iteration processing performed by the iteration processor to obtain encoded channels. The output interface is configured to generate an encoded multi-channel signal having the encoded channels and the first and the second multi-channel parameters.

Further embodiments provide an apparatus for decoding an encoded multi-channel signal, the encoded multi-channel signal having encoded channels and at least first and second multi-channel parameters. The apparatus comprises a channel decoder and a multi-channel processor. The channel decoder is configured to decode the encoded channels to obtain decoded channels. The multi-channel processor is configured to perform a multi-channel processing using a second pair of the decoded channels identified by the second multi-channel parameters and using the second multi-channel parameters to obtain processed channels and to perform a further multi-channel processing using a first pair of channels identified by the first multi-channel parameters and using the first multi-channel parameters, wherein the first pair of channels comprises at least one processed channel.

In contrast to common multi-channel encoding concepts which use a fixed signal path (e.g., stereo coding tree), embodiments of the present invention use a dynamic signal path which is adapted to characteristics of the at least three input channels of the multi-channel input signal. In detail, the iteration processor 102 can be adapted to build the signal path (e.g, stereo tree), in the first iteration step, based on an inter-channel correlation value between each pair of the at least three channels CH1 to CH3, for selecting, in the first iteration step, a pair having the highest value or a value above a threshold, and, in the second iteration step, based on inter-channel correlation values between each pair of the at least three channels and corresponding previously processed channels, for selecting, in the second iteration step, a pair having the highest value or a value above a threshold.

Further embodiments provide a method for encoding a multi-channel signal having at least three channels. The method comprises:

- calculating, in a first iteration step, inter-channel correlation values between each pair of the at least three channels, selecting, in the first iteration step, a pair having a highest value or having a value above a threshold, and processing the selected pair using a multichannel processing operation to derive first multichannel parameters for the selected pair and to derive first processed channels;
- performing the calculating, the selecting and the processing in a second iteration step using at least one of the processed channels to derive second multichannel parameters and second processed channels;
- encoding channels resulting from an iteration processing performed by the iteration processor to obtain encoded channels; and
- generating an encoded multi-channel signal having the encoded channels and the first and the second multichannel parameters.

Further embodiments provide a method for decoding an encoded multi-channel signal having encoded channels and at least first and second multichannel parameters. The method comprises:

- decoding the encoded channels to obtain decoded channels; and
- performing a multichannel processing using a second pair of the decoded channels identified by the second multichannel parameters and using the second multichannel parameters to obtain processed channels, and performing a further multichannel processing using a first pair of channels identified by the first multichannel parameters and using the first multichannel parameters, wherein the first pair of channels comprises at least one processed channel.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
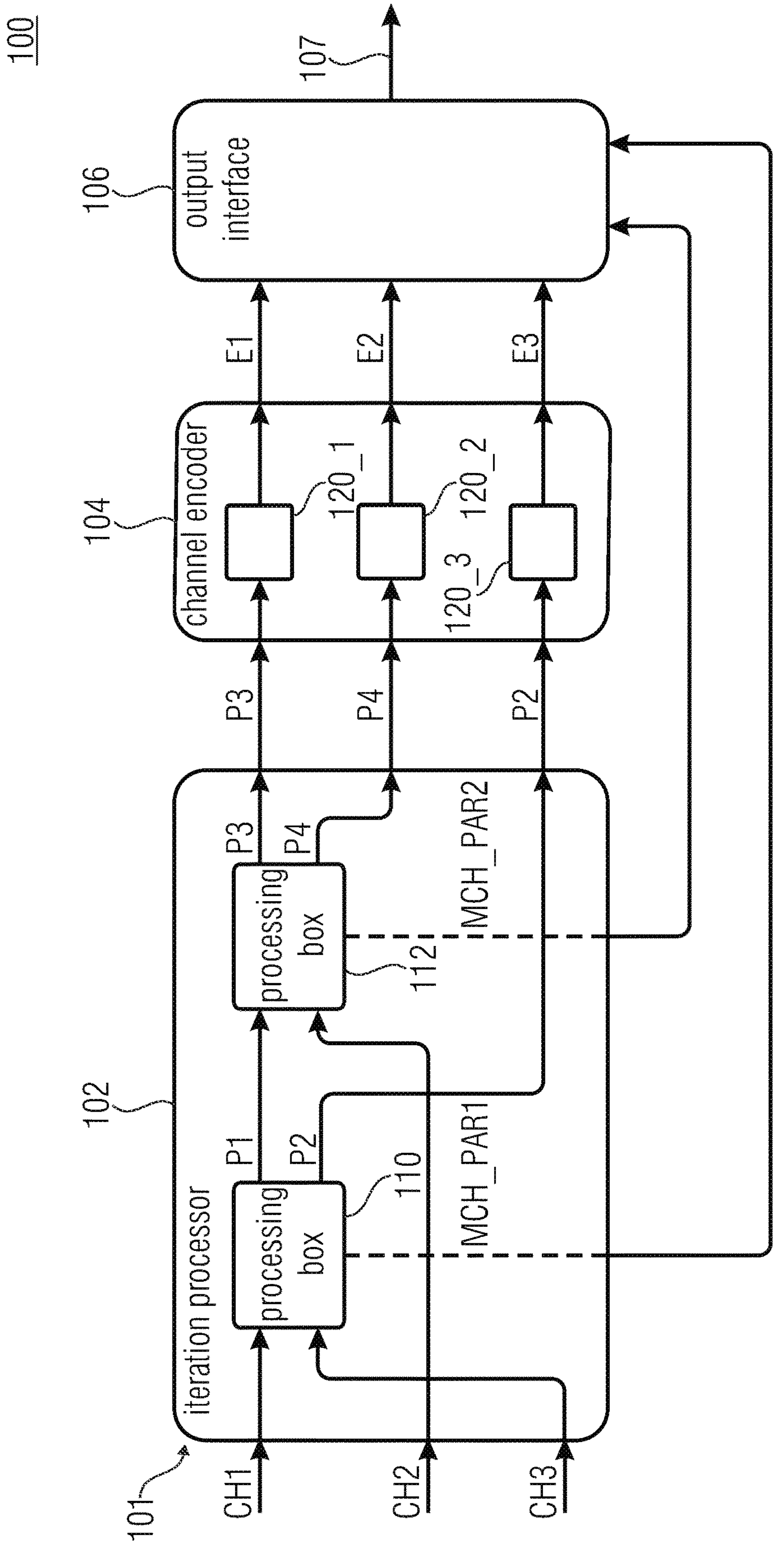
FIG. 1 shows a schematic block diagram of an apparatus for encoding a multi-channel signal having at least three channels, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of an apparatus (encoder) 100 for encoding a multi-channel signal 101 having at least three channels CH1 to CH3. The apparatus 100 comprises an iteration processor 102, a channel encoder 104 and an output interface 106.

The iteration processor 102 is configured to calculate, in a first iteration step, inter-channel correlation values between each pair of the at least three channels CH1 to CH3 for selecting, in the first iteration step, a pair having a highest value or having a value above a threshold, and for processing the selected pair using a multi-channel processing operation to derive first multi-channel parameters MCH_PAR1 for the selected pair and to derive first processed channels P1 and P2. Further, the iteration processor 102 is configured to perform the calculating, the selecting and the processing in a second iteration step using at least one of the processed channels P1 or P2 to derive second multi-channel parameters MCH_PAR2 and second processed channels P3 and P4.

For example, as indicated in FIG. 1, the iteration processor 102 may calculate in the first iteration step an inter-channel correlation value between a first pair of the at least three channels CH1 to CH3, the first pair consisting of a first channel CH1 and a second channel CH2, an inter-channel correlation value between a second pair of the at least three channels CH1 to CH3, the second pair consisting of the second channel CH2 and a third channel CH3, and an inter-channel correlation value between a third pair of the at least three channels CH1 to CH3, the third pair consisting of the first channel CH1 and the third channel CH3.

In FIG. 1 it is assumed that in the first iteration step the third pair consisting of the first channel CH1 and the third channel CH3 comprises the highest inter-channel correlation value, such that the iteration processor 102 selects in the first iteration step the third pair having the highest inter-channel correlation value and processes the selected pair, i.e., the third pair, using a multi-channel processing operation to derive first multi-channel parameters MCH_PAR1 for the selected pair and to derive first processed channels P1 and P2.

Further, the iteration processor 102 can be configured to calculate, in the second iteration step, inter-channel correlation values between each pair of the at least three channels CH1 to CH3 and the processed channels P1 and P2, for selecting, in the second iteration step, a pair having a highest inter-channel correlation value or having a value above a threshold. Thereby, the iteration processor 102 can be configured to not select the selected pair of the first iteration step in the second iteration step (or in any further iteration step).

Referring to the example shown in FIG. 1, the iteration processor 102 may further calculate an inter-channel correlation value between a fourth pair of channels consisting of the first channel CH1 and the first processed channel P1, an inter-channel correlation value between a fifth pair consisting of the first channel CH1 and the second processed channel P2, an inter-channel correlation value between a sixth pair consisting of the second channel CH2 and the first processed channel P1, an inter-channel correlation value between a seventh pair consisting of the second channel CH2 and the second processed channel P2, an inter-channel correlation value between an eighth pair consisting of the third channel CH3 and the first processed channel P1, an inter-correlation value between a ninth pair consisting of the third channel CH3 and the second processed channel P2, and an inter-channel correlation value between a tenth pair consisting of the first processed channel P1 and the second processed channel P2.

In FIG. 1, it is assumed that in the second iteration step the sixth pair consisting of the second channel CH2 and the first processed channel P1 comprises the highest inter-channel correlation value, such that the iteration processor 102 selects in the second iteration step the sixth pair and processes the selected pair, i.e., the sixth pair, using a multi-channel processing operation to derive second multi-channel parameters MCH_PAR2 for the selected pair and to derive second processed channels P3 and P4.

The iteration processor 102 can be configured to only select a pair when the level difference of the pair is smaller than a threshold, the threshold being smaller than 40 dB, 25 dB, 12 dB or smaller than 6 dB. Thereby, the thresholds of 25 or 40 dB correspond to rotation angles of 3 or 0.5 degree.

The iteration processor 102 can be configured to calculate normalized integer correlation values, wherein the iteration processor 102 can be configured to select a pair, when the integer correlation value is greater than e.g. 0.2 or advantageously 0.3.

Further, the iteration processor 102 may provide the channels resulting from the multichannel processing to the channel encoder 104. For example, referring to FIG. 1, the iteration processor 102 may provide the third processed channel P3 and the fourth processed channel P4 resulting from the multichannel processing performed in the second iteration step and the second processed channel P2 resulting from the multichannel processing performed in the first iteration step to the channel encoder 104. Thereby, the iteration processor 102 may only provide those processed channels to the channel encoder 104 which are not (further) processed in a subsequent iteration step. As shown in FIG. 1, the first processed channel P1 is not provided to the channel encoder 104 since it is further processed in the second iteration step.

The channel encoder 104 can be configured to encode the channels P2 to P4 resulting from the iteration processing (or multichannel processing) performed by the iteration processor 102 to obtain encoded channels E1 to E3.

For example, the channel encoder 104 can be configured to use mono encoders (or mono boxes, or mono tools) 120_1 to 120_3 for encoding the channels P2 to P4 resulting from the iteration processing (or multichannel processing). The mono boxes may be configured to encode the channels such that less bits may be used for encoding a channel having less energy (or a smaller amplitude) than for encoding a channel having more energy (or a higher amplitude). The mono boxes 120_1 to 120_3 can be, for example, transformation based audio encoders. Further, the channel encoder 104 can be configured to use stereo encoders (e.g., parametric stereo encoders, or lossy stereo encoders) for encoding the channels P2 to P4 resulting from the iteration processing (or multichannel processing).

The output interface 106 can be configured to generate and encoded multi-channel signal 107 having the encoded channels E1 to E3 and the first and the second multi-channel parameters MCH_PAR1 and MCH_PAR2.

For example, the output interface 106 can be configured to generate the encoded multi-channel signal 107 as a serial signal or serial bit stream, and so that the second multi-channel parameters MCH_PAR2 are in the encoded signal 107 before the first multi-channel parameters MCH_PAR1. Thus, a decoder, an embodiment of which will be described later with respect to FIG. 4, will receive the second multi-channel parameters MCH_PAR2 before the first multi-channel parameters MCH-PAR1.

In FIG. 1 the iteration processor 102 exemplarily performs two multi-channel processing operations, a multi-channel processing operation in the first iteration step and a multi-channel processing operation in the second iteration step. Naturally, the iteration processor 102 also can perform further multi-channel processing operations in subsequent iteration steps. Thereby, the iteration processor 102 can be configured to perform iteration steps until an iteration termination criterion is reached. The iteration termination criterion can be that a maximum number of iteration steps is equal to or higher than a total number of channels of the multi-channel signal 101 by two, or wherein the iteration termination criterion is, when the inter-channel correlation values do not have a value greater than the threshold, the threshold advantageously being greater than 0.2 or the threshold advantageously being 0.3. In further embodiments, the iteration termination criterion can be that a maximum number of iteration steps is equal to or higher than a total number of channels of the multi-channel signal 101, or wherein the iteration termination criterion is, when the inter-channel correlation values do not have a value greater than the threshold, the threshold advantageously being greater than 0.2 or the threshold advantageously being 0.3.

For illustration purposes the multi-channel processing operations performed by the iteration processor 102 in the first iteration step and the second iteration step are exemplarily illustrated in FIG. 1 by processing boxes 110 and 112. The processing boxes 110 and 112 can be implemented in hardware or software. The processing boxes 110 and 112 can be stereo boxes, for example.

Thereby, inter-channel signal dependency can be exploited by hierarchically applying known joint stereo coding tools. In contrast to previous MPEG approaches, the signal pairs to be processed are not predetermined by a fixed signal path (e.g., stereo coding tree) but can be changed dynamically to adapt to input signal characteristics. The inputs of the actual stereo box can be (1) unprocessed channels, such as the channels CH1 to CH3, (2) outputs of a preceding stereo box, such as the processed signals P1 to P4, or (3) a combination of an unprocessed channel and an output of a preceding stereo box.

The processing inside the stereo box 110 and 112 can either be prediction based (like complex prediction box in USAC) or KLT/PCA based (the input channels are rotated (e.g., via a 2×2 rotation matrix) in the encoder to maximize energy compaction, i.e., concentrate signal energy into one channel, in the decoder the rotated signals will be retransformed to the original input signal directions).

In a possible implementation of the encoder 100, (1) the encoder calculates an inter channel correlation between every channel pair and selects one suitable signal pair out of the input signals and applies the stereo tool to the selected channels; (2) the encoder recalculates the inter channel correlation between all channels (the unprocessed channels as well as the processed intermediate output channels) and selects one suitable signal pair out of the input signals and applies the stereo tool to the selected channels; and (3) the encoder repeats step (2) until all inter channel correlation is below a threshold or if a maximum number of transformations is applied.

As already mentioned, the signal pairs to be processed by the encoder 100, or more precisely the iteration processor 102, are not predetermined by a fixed signal path (e.g., stereo coding tree) but can be changed dynamically to adapt to input signal characteristics. Thereby, the encoder 100 (or the iteration processor 102) can be configured to construct the stereo tree in dependence on the at least three channels CH1 to CH3 of the multi-channel (input) signal 101. In other words, the encoder 100 (or the iteration processor 102) can be configured to build the stereo tree based on an inter-channel correlation (e.g., by calculating, in the first iteration step, inter-channel correlation values between each pair of the at least three channels CH1 to CH3, for selecting, in the first iteration step, a pair having the highest value or a value above a threshold, and by calculating, in a second iteration step, inter-channel correlation values between each pair of the at least three channels and previously processed channels, for selecting, in the second iteration step, a pair having the highest value or a value above a threshold). According to a one step approach, a correlation matrix may be calculated for possibly each iteration containing the correlations of all, in previous iterations possibly processed, channels.

As indicated above, the iteration processor 102 can be configured to derive first multi-channel parameters MCH_PAR1 for the selected pair in the first iteration step and to derive second multi-channel parameters MCH_PAR2 for the selected pair in the second iteration step. The first multi-channel parameters MCH_PAR1 may comprise a first channel pair identification (or index) identifying (or signaling) the pair of channels selected in the first iteration step, wherein the second multi-channel parameters MCH_PAR2 may comprise a second channel pair identification (or index) identifying (or signaling) the pair of channels selected in the second iteration step.

In the following, an efficient indexing of input signals is described. For example, channel pairs can be efficiently signaled using a unique index for each pair, dependent on the total number of channels. For example, the indexing of pairs for six channels can be as shown in the following table:

| | 0 | 1 | 2 | 3 | 4 | 5 |
|---|---|---|---|---|---|---|
| 0 | | 0 | 1 | 2 | 3 | 4 |
| 1 | | | 5 | 6 | 7 | 8 |

-continued

| | 0 | 1 | 2 | 3 | 4 | 5 |
|---|---|---|---|---|---|---|
| 2 | | | | 9 | 10 | 11 |
| 3 | | | | | 12 | 13 |
| 4 | | | | | | 14 |
| 5 | | | | | | |

For example, in the above table the index 5 may signal the pair consisting of the first channel and the second channel. Similarly, the index 6 may signal the pair consisting of the first channel and the third channel.

The total number of possible channel pair indices for n channels can be calculated to:

numPairs=numChannels*(numChannels−1)/2

Hence, the number of bits needed for signaling one channel pair amount to:

$$numBits=floor(\log_2(numPairs-1))+1$$

Further, the encoder 100 may use a channel mask. The multichannel tool's configuration may contain a channel mask indicating for which channels the tool is active. Thus, LFEs (LFE=low frequency effects/enhancement channels) can be removed from the channel pair indexing, allowing for a more efficient encoding. E.g. for a 11.1 setup, this reduces the number of channel pair indices from 12*11/2=66 to 11*10/2=55, allowing signaling with 6 instead of 7 bit. This mechanism can also be used to exclude channels intended to be mono objects (e.g. multiple language tracks). On decoding of the channel mask (channelMask), a channel map (channelMap) can be generated to allow re-mapping of channel pair indices to decoder channels.

Moreover, the iteration processor 102 can be configured to derive, for a first frame, a plurality of selected pair indications, wherein the output interface 106 can be configured to include, into the multi-channel signal 107, for a second frame, following the first frame, a keep indicator, indicating that the second frame has the same plurality of selected pair indications as the first frame.

The keep indicator or the keep tree flag can be used to signal that no new tree is transmitted, but the last stereo tree shall be used. This can be used to avoid multiple transmission of the same stereo tree configuration if the channel correlation properties stay stationary for a longer time.

Figure 2:
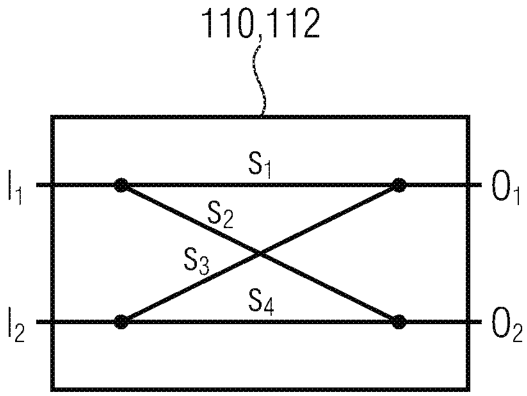
FIG. 2 shows a schematic block diagram of an apparatus for encoding a multi-channel signal having at least three channels, according to an embodiment.

FIG. 2 shows a schematic block diagram of a stereo box 110, 112. The stereo box 110, 112 comprises inputs for a first input signal I1 and a second input signal I2, and outputs for a first output signal O1 and a second output signal O2. As indicated in FIG. 2, dependencies of the output signals O1 and O2 from the input signals I1 and I2 can be described by the s-parameters S1 to S4.

The iteration processor 102 can use (or comprise) stereo boxes 110, 112 in order to perform the multi-channel processing operations on the input channels and/or processed channels in order to derive (further) processed channels. For example, the iteration processor 102 can be configured to use generic, prediction based or KLT (Karhunen-Loève-Transformation) based rotation stereo boxes 110, 112.

A generic encoder (or encoder-side stereo box) can be configured to encode the input signals I1 and I2 to obtain the output signals O1 and O2 based on the equation:

$$\begin{bmatrix} O_1 \\ O_2 \end{bmatrix} = \begin{bmatrix} s_1 & s_2 \\ s_3 & s_4 \end{bmatrix} \cdot \begin{bmatrix} I_1 \\ I_2 \end{bmatrix}.$$

A generic decoder (or decoder-side stereo box) can be configured to decode the input signals I1 and I2 to obtain the output signals O1 and O2 based on the equation:

$$\begin{bmatrix} O_1 \\ O_2 \end{bmatrix} = \begin{bmatrix} s_1 & s_2 \\ s_3 & s_4 \end{bmatrix}^{-1} \cdot \begin{bmatrix} I_1 \\ I_2 \end{bmatrix}.$$

A prediction based encoder (or encoder-side stereo box) can be configured to encode the input signals I1 and I2 to obtain the output signals O1 and O2 based on the equation $$\begin{bmatrix} O_1 \\ O_2 \end{bmatrix} = 0.5 \cdot \begin{bmatrix} 1 & 1 \\ 1-p & -(1+p) \end{bmatrix} \cdot \begin{bmatrix} I_1 \\ I_2 \end{bmatrix},$$

wherein p is the prediction coefficient.

A prediction based decoder (or decoder-side stereo box) can be configured to decode the input signals I1 and I2 to obtain the output signals O1 and O2 based on the equation:

$$\begin{bmatrix} O_1 \\ O_2 \end{bmatrix} = \begin{bmatrix} 1+p & 1 \\ 1-p & -1 \end{bmatrix} \cdot \begin{bmatrix} I_1 \\ I_2 \end{bmatrix}.$$

A KLT based rotation encoder (or encoder-side stereo box) can be configured to encode the input signals I1 to I2 to obtain the output signals O1 and O2 based on the equation:

$$\begin{bmatrix} O_1 \\ O_2 \end{bmatrix} = \begin{bmatrix} \cos\alpha & \sin\alpha \\ -\sin\alpha & \cos\alpha \end{bmatrix} \cdot \begin{bmatrix} I_1 \\ I_2 \end{bmatrix}.$$

A KLT based rotation decoder (or decoder-side stereo box) can be configured to decode the input signals I1 and I2 to obtain the output signals O1 and O2 based on the equation (inverse rotation):

$$\begin{bmatrix} O_1 \\ O_2 \end{bmatrix} = \begin{bmatrix} \cos\alpha & -\sin\alpha \\ \sin\alpha & \cos\alpha \end{bmatrix} \cdot \begin{bmatrix} I_1 \\ I_2 \end{bmatrix}.$$

In the following, a calculation of the rotation angle α for the KLT based rotation is described.

The rotation angle α for the KLT based rotation can be defined as:

$$\alpha = \frac{1}{2}\tan^{-1}\left(\frac{2c_{12}}{c_{11} - c_{22}}\right)$$

with $c_{xy}$ being the entries of a non-normalized correlation matrix, wherein $c_{11}$, $c_{22}$ are the channel energies.

This can be implemented using the a tan 2 function to allow for differentiation between negative correlations in the numerator and negative energy difference in the denominator:

alpha=0.5*a tan 2(2*correlation[ch1][ch2],(correlation[ch1][ch1]−correlation[ch2][ch2]));

Further, the iteration processor 102 can be configured to calculate an inter-channel correlation using a frame of each channel comprising a plurality of bands so that a single inter-channel correlation value for the plurality of bands is obtained, wherein the iteration processor 102 can be configured to perform the multi-channel processing for each of the plurality of bands so that the first or the second multi-channel parameters are obtained from each of the plurality of bands.

Thereby, the iteration processor 102 can be configured to calculate stereo parameters in the multi-channel processing, wherein the iteration processor 102 can be configured to only perform a stereo processing in bands, in which a stereo parameter is higher than a quantized-to-zero threshold defined by a stereo quantizer (e.g., KLT based rotation encoder). The stereo parameters can be, for example, MS On/Off or rotation angles or prediction coefficients).

For example, the iteration processor 102 can be configured to calculate rotation angles in the multi-channel processing, wherein the iteration processor 102 can be configured to only perform a rotation processing in bands, in which a rotation angle is higher than a quantized-to-zero threshold defined by a rotation angle quantizer (e.g., KLT based rotation encoder).

Thus, the encoder 100 (or output interface 106) can be configured to transmit the transformation/rotation information either as one parameter for the complete spectrum (full band box) or as multiple frequency dependent parameters for parts of the spectrum.

The encoder 100 can be configured to generate the bit stream 107 based on the following tables:

TABLE 1

Syntax of mpegh3daExtElementConfig( )

```
Syntax                                                        No. of bits  Mnemonic

mpegh3daExtElementConfig( )
{
    usacExtElementType            = escapedValue(4, 8, 16);
    usacExtElementConfigLength    = escapedValue(4, 8, 16);
    if (usacExtElementDefaultLengthPresent) {                 1            uimsbf
        usacExtElementDefaultLength = escapedValue(8, 16, 0) + 1;
    } else {
        usacExtElementDefaultLength = 0;
    }
    usacExtElementPayloadFrag;                                1            uimsbf
    switch (usacExtElementType) {
    case ID_EXT_ELE_FILL:
        /* No configuration element */
        break;
    case ID_EXT_ELE_MPEGS:
        SpatialSpecificConfig( );
        break;
    case ID_EXT_ELE_SAOC:
        SAOCSpecificConfig( );
        break;
    case ID_EXT_ELE_AUDIOPREROLL:
        /* No configuration element */
        break;
    case ID_EXT_ELE_UNI_DRC:
        mpegh3daUniDrcConfig( );
        break;
    case ID_EXT_ELE_OBJ_METADATA:
        ObjectMetadataConfig( );
        break;
    case ID_EXT_ELE_SAOC_3D:
        SAOC3DSpecificConfig( );
        break;
    case ID_EXT_ELE_HOA:
        HOAConfig( );
        break;
    case ID_EXT_ELE_MCC: /* multi channel coding */
        MCCConfig(grp);
        break;
    case ID_EXT_ELE_FMT_CNVRTR
        /* No configuration element */
        break;
    default:                                                  NOTE
        while (usacExtElementConfigLength--) {
            tmp;                                              8            uimsbf
        }
        break;
    }
}
```

NOTE:
The default entry for the usacExtElementType is used for unknown extElementTypes so that legacy decoders can cope with future extensions.

TABLE 21

Syntax of MCCConfig( ),

| Syntax | No. of bits | Mnemonic |
|---|---|---|
| MCCConfig(grp) | | |
| { | | |
| nChannels = 0 | | |
| for(chan=0;chan < bsNumberOfSignals[grp]; chan++) | | |
| chanMask[chan] | 1 | |
| if(chanMask[chan] > 0) { | | |
| mctChannelMap[nChannels]=chan; | | |
| nChannels++; | | |
| } | | |
| } | | |
| } | | |

NOTE:
The corresponding ID_USAC_EXT element shall be prior to any audio element of the certain signal group grp.

TABLE 32

Syntax of MultichannelCodingBoxBandWise( )

| Syntax | No. of bits | Mnemonic |
|---|---|---|
| MultichannelCodingBoxBandWise( ) | | |
| { | | |
| for(pair=0; pair<numPairs;pair++) { | | |
| if (keepTree == 0) { | | |
| channelPairIndex[pair] | nBits NOTE 1) | |
| } | | |
| else { | | |
| channelPairIndex[pair]= | | |
| lastChannelPairIndex[pair]; | | |
| } | | |
| hasMctMask | 1 | |
| hasBandwiseAngles | 1 | |
| if (hasMctMask \|\| hasBandwiseAngles) { | | |
| isShort | 1 | |
| numMaskBands; | 5 | |
| if (isShort) { | | |
| numMaskBands = numMaskBands*8 | | |
| } | | |
| } else { | NOTE 2) | |
| numMaskBands = MAX_NUM_MC_BANDS; | | |
| } | | |
| if (hasMctMask) { | | |
| for(j=0;j<numMaskBands;j++) { | | |
| msMask[pair][j]; | 1 | |
| } else { | | |
| for(j=0;j<numMaskBands;j++) { | | |
| msMask[pair][j] = 1; | | |
| } | | |
| } | | |
| } | | |
| If(indepFlag > 0) { | | |
| delta_code_time = 0; | | |
| } else { | | |
| delta_code_time; | 1 | |
| } | | |
| if (hasBandwiseAngles == 0) { | | |
| hcod_angle[dpcm_alpha[pair][0]]; | 1..10 | vlclbf |
| } | | |
| else { | | |
| for(j=0;j< numMaskBands;j++) { | | |
| if (msMask[pair][j] ==1) { | | |
| hcod_angle[dpcm_alpha[pair][j]]; | 1..10 | vlclbf |
| } | | |
| } | | |
| } | | |
| } | | |
| } | | |

NOTE
1) nBits = floor(log2(nChannels*(nChannels-1)/2 − 1)) + 1

TABLE 4

| Syntax of MultichannelCodingBoxFullband( ) | | |
|---|---|---|
| **Syntax** | **No. of bits** | **Mnemonic** |
| MultichannelCodingBoxFullband | | |
| { | | |
| for (pair=0; pair<numPairs; pair++) { | | |
| If(keepTree == 0) { | | |
| channelPairIndex[pair] | nBits NOTE 1) | |
| } | | |
| else { | | |
| numPairs = lastNumPairs; | | |
| } | | |
| alpha; | 8 | |
| } | | |

NOTE:
1) nBits = floor(log2(nChannels*(nChannels-1)/2 − 1)) + 1

TABLE 7

| Interpretation of data blocks for extension payload decoding | |
|---|---|
| **usacExtElementType** | **The concatenated usacExtElementSegmentData represents:** |
| ID_EXT_ELE_FILL | Series of fill byte |
| ID_EXT_ELE_MPEGS | SpatialFrame( ) |
| ID_EXT_ELE_SAOC | SaocFrame( ) |
| ID_EXT_ELE_AUDIOPREROLL | AudioPreRoll( ) |
| ID_EXT_ELE_UNI_DRC | uniDrcGain( as defined in ISO/IEC 23003-4 |
| ID_EXT_ELE_OBJ_METADATA | object metadataf( ) |
| ID_EXT_ELE_SAOC_3D | Saoc3DFrame( ) |
| ID_EXT_ELE_HOA | HOAFrame( ) |
| ID_EXT_ELE_FMT_CNVRTR | FormatConverterFrame( ) |

TABLE 5

| Syntax of MultichannelCodingFrame( ) | | |
|---|---|---|
| **Syntax** | **No.** | **Mnemonic** |
| MultichannelCodingFrame( ) | | |
| { | | |
| MCCSignalingType | 2 | |
| keepTree | 1 | |
| if(keepTree==0) { | | |
| numPairs | 5 | |
| } | | |
| else { | | |
| numPairs=lastNumPairs; | | |
| } | | |
| if(MCCSignalingType == 0) {/* tree of standard stereo boxes */ | | |
| for(i=0;i<numPairs;i++) { | | |
| MCCBox[i] = StereoCoreToolInfo(0); | | |
| } | | |
| } | | |
| if(MCCSignalingType == 1) {/* arbitrary mct trees */ | | |
| MultichannelCodingBoxBandWise( ); | | |
| } | | |
| if(MCCSignalingType == 2) {/* transmitted trees */ | | |
| } | | |
| if(MCCSignalingType == 3) {/* simple fullband tree */ | | |
| MultichannelCodingBoxFullband( ); | | |
| } | | |
| } | | |

TABLE 6

| Value of usacExtElementType | |
|---|---|
| **usacExtElementType** | **Value** |
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| ID_EXT_ELE_MCC | 9 or 10 |
| /* reserved for ISO use */ | 10-127 |
| /* reserved for use outside of ISO scope */ | 128 and higher |

NOTE:
Application-specific usacExtElementType values are mandated to be in the space reserved for use outside of ISO scope. These are skipped by a decoder as a minimum of structure may be used by the decoder to skip these extensions.

TABLE 7-continued

| Interpretation of data blocks for extension payload decoding | |
|---|---|
| **usacExtElementType** | **The concatenated usacExtElementSegmentData represents:** |
| ID_EXT_ELE_MCC | MultichannelCodingFrame( ) |
| unknown | unknown data. The data block shall be discarded. |

Figure 3:
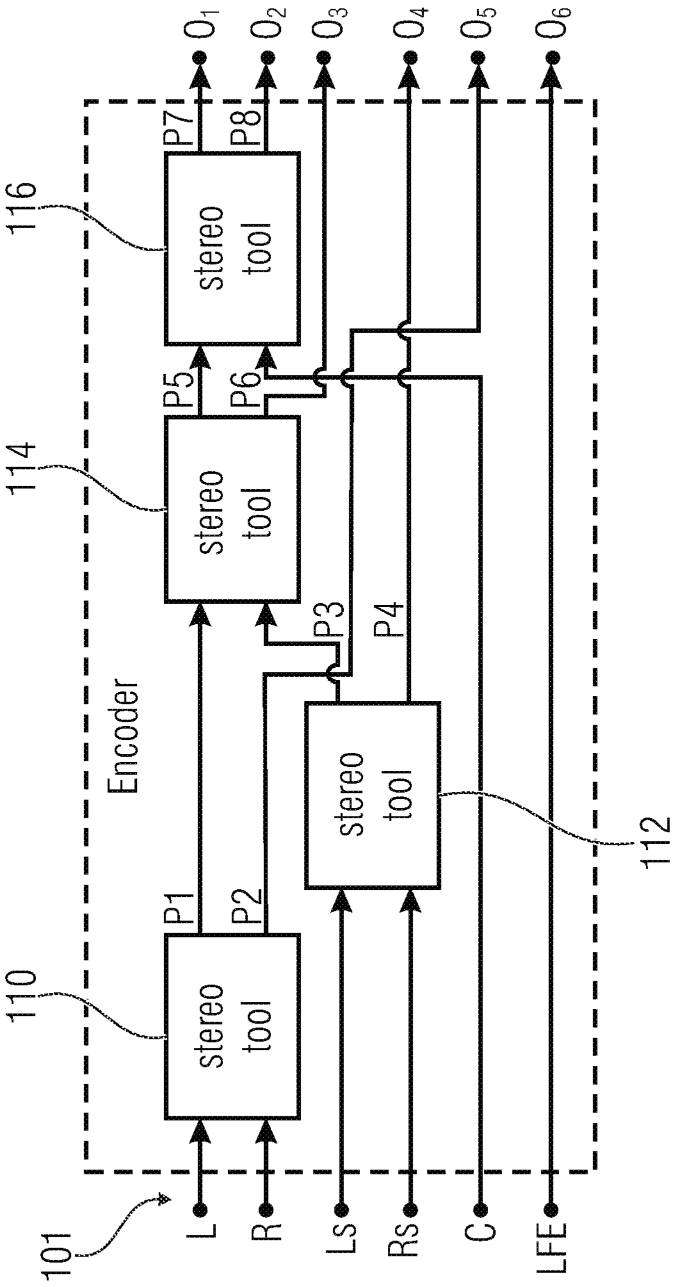
FIG. 3 shows a schematic block diagram of a stereo box, according to an embodiment.

FIG. 3 shows a schematic block diagram of an iteration processor 102, according to an embodiment. In the embodiment shown in FIG. 3, the multichannel signal 101 is a 5.1 channel signal having six channels: a left channel L, a right channel R, a left surround channel Ls, a right surround channel Rs, a center channel C and a low frequency effects channel LFE.

As indicated in FIG. 3, the LFE channel is not processed by the iteration processor 102. This might be the case since the inter-channel correlation values between the LFE channel and each of the other five channels L, R, Ls, Rs, and C are to small, or since the channel mask indicates not to process the LFE channel, which will be assumed in the following.

In a first iteration step, the iteration processor 102 calculates the inter-channel correlation values between each pair of the five channels L, R, Ls, Rs, and C, for selecting, in the first iteration step, a pair having a highest value or having a value above a threshold. In FIG. 3 it is assumed that the left channel L and the right channel R have the highest value, such that the iteration processor 102 processes the left channel L and the right channel R using a stereo box (or stereo tool) 110, which performs the multi-channel operation processing operation, to derive first and second processed channels P1 and P2.

In a second iteration step, the iteration processor 102 calculates inter-channel correlation values between each pair of the five channels L, R, Ls, Rs, and C and the processed channels P1 and P2, for selecting, in the second iteration step, a pair having a highest value or having a value above a threshold. In FIG. 3 it is assumed that the left surround channel Ls and the right surround channel Rs have the highest value, such that the iteration processor 102 processes the left surround channel Ls and the right surround channel Rs using the stereo box (or stereo tool) 112, to derive third and fourth processed channels P3 and P4.

In a third iteration step, the iteration processor 102 calculates inter-channel correlation values between each pair of the five channels L, R, Ls, Rs, and C and the processed channels P1 to P4, for selecting, in the third iteration step, a pair having a highest value or having a value above a threshold. In FIG. 3 it is assumed that the first processed channel P1 and the third processed channel P3 have the highest value, such that the iteration processor 102 processes the first processed channel P1 and the third processed channel P3 using the stereo box (or stereo tool) 114, to derive fifth and sixth processed channels P5 and P6.

In a fourth iteration step, the iteration processor 102 calculates inter-channel correlation values between each pair of the five channels L, R, Ls, Rs, and C and the processed channels P1 to P6, for selecting, in the fourth iteration step, a pair having a highest value or having a value above a threshold. In FIG. 3 it is assumed that the fifth processed channel P5 and the center channel C have the highest value, such that the iteration processor 102 processes the fifth processed channel P5 and the center channel C using the stereo box (or stereo tool) 115, to derive seventh and eighth processed channels P7 and P8.

The stereo boxes 110 to 116 can be MS stereo boxes, i.e. mid/side stereophony boxes configured to provide a mid-channel and a side-channel. The mid-channel can be the sum of the input channels of the stereo box, wherein the side-channel can be the difference between the input channels of the stereo box. Further, the stereo boxes 110 and 116 can be rotation boxes or stereo prediction boxes.

In FIG. 3, the first processed channel P1, the third processed channel P3 and the fifth processed channel P5 can be mid-channels, wherein the second processed channel P2, the fourth processed channel P4 and the sixth processed channel P6 can be side-channels.

Further, as indicated in FIG. 3, the iteration processor 102 can be configured to perform the calculating, the selecting and the processing in the second iteration step and, if applicable, in any further iteration step using the input channels L, R, Ls, Rs, and C and (only) the mid-channels P1, P3 and P5 of the processed channels. In other words, the iteration processor 102 can be configured to not use the side-channels P1, P3 and P5 of the processed channels in the calculating, the selecting and the processing in the second iteration step and, if applicable, in any further iteration step.

Figure 4:
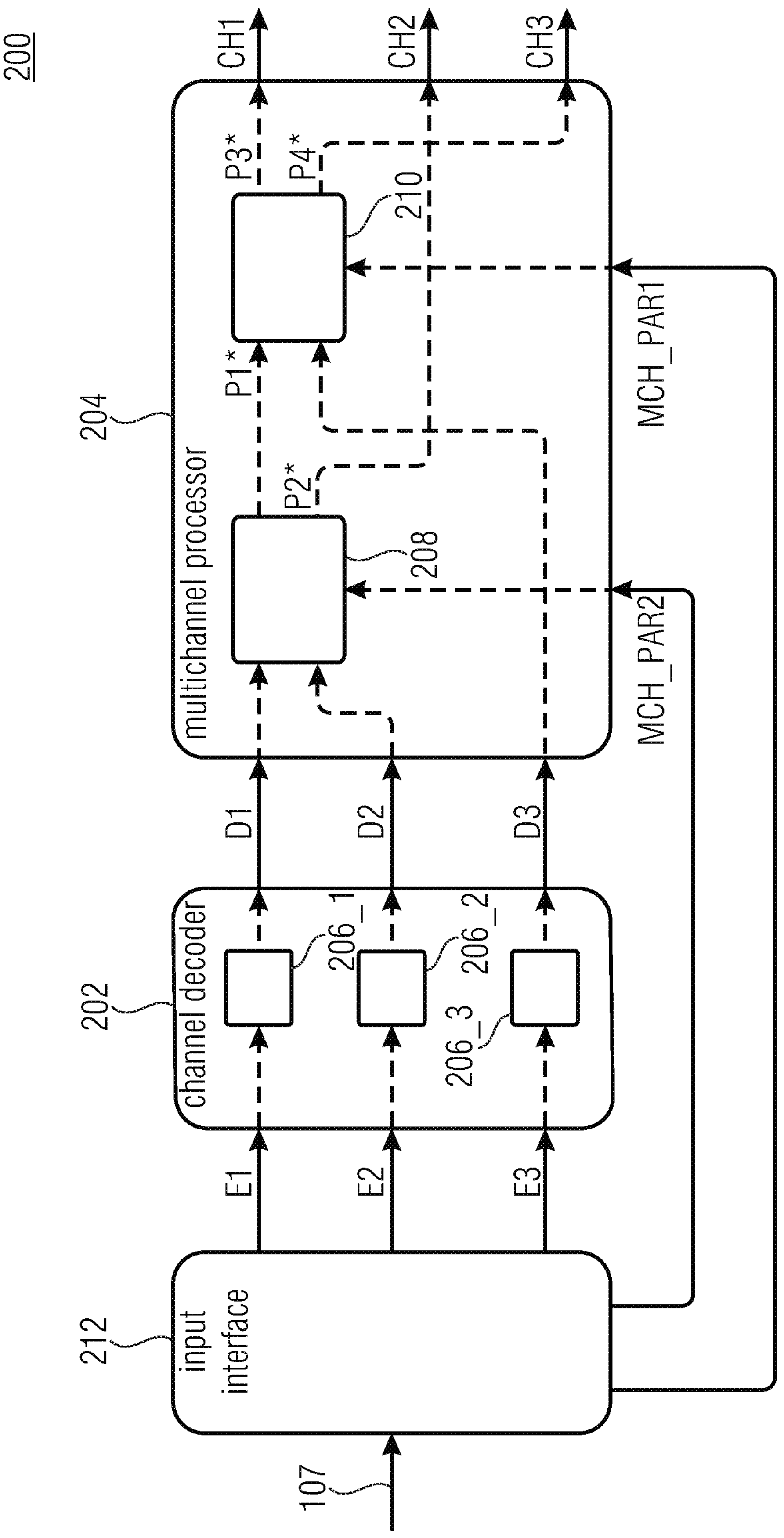
FIG. 4 shows a schematic block diagram of an apparatus for decoding an encoded multi-channel signal having encoded channels and at least first and second multi-channel parameters, according to an embodiment.

FIG. 4 shows a schematic block diagram of an apparatus (decoder) 200 for decoding an encoded multi-channel signal 107 having encoded channels E1 to E3 and at least first and second multi-channel parameters MCH_PAR1 and MCH_PAR2. The apparatus 200 comprises a channel decoder 202 and a multi-channel processor 204.

The channel decoder 202 is configured to decode the encoded channels E1 to E3 to obtain decoded channels in D1 to D3.

For example, the channel decoder 202 can comprise at least three mono decoders (or mono boxes, or mono tools) 206_1 to 206_3, wherein each of the mono decoders 206_1 to 206_3 can be configured to decode one of the at least three encoded channels E1 to E3, to obtain the respective decoded channel E1 to E3. The mono decoders 206_1 to 206_3 can be, for example, transformation based audio decoders.

The multi-channel processor 204 is configured for performing a multi-channel processing using a second pair of the decoded channels identified by the second multi-channel parameters MCH_PAR2 and using the second multi-channel parameters MCH_PAR2 to obtain processed channels, and for performing a further multi-channel processing using a first pair of channels identified by the first multi-channel parameters MCH_PAR1 and using the first multi-channel parameters MCH_PAR1, where the first pair of channels comprises at least one processed channel.

As indicated in FIG. 4 by way of example, the second multi-channel parameters MCH_PAR2 may indicate (or signal) that the second pair of decoded channels consists of the first decoded channel D1 and the second decoded channel D2. Thus, the multi-channel processor 204 performs a multi-channel processing using the second pair of the decoded channels consisting of the first decoded channel D1 and the second decoded channel D2 (identified by the second multi-channel parameters MCH_PAR2) and using the second multi-channel parameters MCH_PAR2, to obtain processed channels P1* and P2*. The first multi-channel parameters MCH_PAR1 may indicate that the first pair of decoded channels consists of the first processed channel P1* and the third decoded channel D3. Thus, the multi-channel processor 204 performs the further multi-channel processing using this first pair of decoded channels consisting of the first processed channel P1* and the third decoded channel D3 (identified by the first multi-channel parameters MCH_PAR1) and using the first multi-channel parameters MCH_PAR1, to obtain processed channels P3* and P4*.

Further, the multi-channel processor 204 may provide the third processed channel P3* as first channel CH1, the fourth processed channel P4* as third channel CH3 and the second processed channel P2* as second channel CH2.

Assuming that the decoder 200 shown in FIG. 4 receives the encoded multi-channel signal 107 from the encoder 100 shown in FIG. 1, the first decoded channel D1 of the decoder 200 may be equivalent to the third processed channel P3 of the encoder 100, wherein the second decoded channel D2 of the decoder 200 may be equivalent to the fourth processed channel P4 of the encoder 100, and wherein the third decoded channel D3 of the decoder 200 may be equivalent to the second processed channel P2 of the encoder 100. Further, the first processed channel P1* of the decoder 200 may be equivalent to the first processed channel P1 of the encoder 100.

Further, the encoded multi-channel signal 107 can be a serial signal, wherein the second multichannel parameters MCH_PAR2 are received, at the decoder 200, before the first multichannel parameters MCH_PAR1. In that case, the multichannel processor 204 can be configured to process the decoded channels in an order, in which the multichannel parameters MCH_PAR1 and MCH_PAR2 are received by the decoder. In the example shown in FIG. 4, the decoder receives the second multichannel parameters MCH_PAR2 before the first multichannel parameters MCH_PAR1, and thus performs the multichannel processing using the second pair of the decoded channels (consisting of the first and second decoded channels D1 and D2) identified by the second multichannel parameter MCH_PAR2 before performing the multichannel processing using the first pair of the decoded channels (consisting of the first processed channel P1* and the third decoded channel D3) identified by the first multichannel parameter MCH_PAR1.

In FIG. 4, the multichannel processor 204 exemplarily performs two multi-channel processing operations. For illustration purposes, the multi-channel processing operations performed by multichannel processor 204 are illustrated in FIG. 4 by processing boxes 208 and 210. The processing boxes 208 and 210 can be implemented in hardware or software. The processing boxes 208 and 210 can be, for example, stereo boxes, as discussed above with reference to the encoder 100, such as generic decoders (or decoder-side stereo boxes), prediction based decoders (or decoder-side stereo boxes) or KLT based rotation decoders (or decoder-side stereo boxes).

For example, the encoder 100 can use KLT based rotation encoders (or encoder-side stereo boxes). In that case, the encoder 100 may derive the first and second multichannel parameters MCH_PAR1 and MCH_PAR2 such that the first and second multichannel parameters MCH_PAR1 and MCH_PAR2 comprise rotation angles. The rotation angles can be differentially encoded. Therefore, the multichannel processor 204 of the decoder 200 can comprise a differential decoder for differentially decoding the differentially encoded rotation angles.

The apparatus 200 may further comprise an input interface 212 configured to receive and process the encoded multi-channel signal 107, to provide the encoded channels E1 to E3 to the channel decoder 202 and the first and second multi-channel parameters MCH_PAR1 and MCH_PAR2 to the multi-channel processor 204.

As already mentioned, a keep indicator (or keep tree flag) may be used to signal that no new tree is transmitted, but the last stereo tree shall be used. This can be used to avoid multiple transmission of the same stereo tree configuration if the channel correlation properties stay stationary for a longer time.

Therefore, when the encoded multi-channel signal 107 comprises, for a first frame, the first or the second multichannel parameters MCH_PAR1 and MCH_PAR2 and, for a second frame, following the first frame, the keep indicator, the multichannel processor 204 can be configured to perform the multichannel processing or the further multichannel processing in the second frame to the same second pair or the same first pair of channels as used in the first frame.

The multichannel processing and the further multichannel processing may comprise a stereo processing using a stereo parameter, wherein for individual scale factor bands or groups of scale factor bands of the decoded channels D1 to D3, a first stereo parameter is included in the first multichannel parameter MCH_PAR1 and a second stereo parameter is included in the second multichannel parameter MCH_PAR2. Thereby, the first stereo parameter and the second stereo parameter can be of the same type, such as rotation angles or prediction coefficients. Naturally, the first stereo parameter and the second stereo parameter can be of different types. For example, the first stereo parameter can be a rotation angle, wherein the second stereo parameter can be a prediction coefficient, or vice versa.

Further, the first or the second multichannel parameters MCH_PAR1 and MCH_PAR2 can comprise a multichannel processing mask indicating which scale factor bands are multichannel processed and which scale factor bands are not multichannel processed. Thereby, the multichannel processor 204 can be configured to not perform the multichannel processing in the scale factor bands indicated by the multichannel processing mask.

The first and the second multichannel parameters MCH_PAR1 and MCH_PAR2 may each include a channel pair identification (or index), wherein the multichannel processor 204 can be configured to decode the channel pair identifications (or indexes) using a predefined decoding rule or a decoding rule indicated in the encoded multi-channel signal.

For example, channel pairs can be efficiently signaled using a unique index for each pair, dependent on the total number of channels, as described above with reference to the encoder 100.

Further, the decoding rule can be a Huffman decoding rule, wherein the multichannel processor 204 can be configured to perform a Huffman decoding of the channel pair identifications.

The encoded multi-channel signal 107 may further comprise a multichannel processing allowance indicator indicating only a sub-group of the decoded channels, for which the multichannel processing is allowed and indicating at least one decoded channel for which the multichannel processing is not allowed. Thereby, the multichannel processor 204 can be configured for not performing any multichannel processing for the at least one decoded channel, for which the multichannel processing is not allowed as indicated by the multichannel processing allowance indicator.

For example, when the multichannel signal is a 5.1 channel signal, the multichannel processing allowance indicator may indicate that the multichannel processing is only allowed for the 5 channels, i.e. right R, left L, right surround Rs, left surround LS and center C, wherein the multichannel processing is not allowed for the LFE channel.

For the decoding process (decoding of channel pair indices) the following c-code may be used. Thereby, for all channel pairs, the number of channels with active KLT processing (nChannels) as well as the number of channel pairs (numPairs) of the current frame is needed.

```
maxNumPairIdx = nChannels*(nChannels-1)/2 − 1;
numBits = floor(logs(maxNumPairIdx)+1;
pairCounter = 0;
for (chan1=1; chan1 < nChannels; chan1++) {
      fox (chan0=0; chan0 < chan1; chan0++) {
         if (pairCounter == pairIdx) {
            channelPair[0] = chan0;
            channelPair[1] = chan1;
            return;
         }
         else
            pairCounter++;
      }
   }
}
```

For decoding the prediction coefficients for non-bandwise angles the following c-code can be used.

```
for(pair=0; pair<numPairs; pair++) {
      mctBandsPerWindow = numMaskBands [pair] /windowsPerFrame;
      if(delta_code_time[pair] > 0) {
         lastVal = alpha_prev_fullband[pair];
      } else {
         lastVal = DEFAULT_ALPHA;
      }
      newAlpha = lastVal + dpcm_alpha[pair][0];
      if(newAlpha >= 64) {
            newAlpha -= 64;
      }
      for (band=0; band < numMaskBands; band++){
         /* set all angles to fullband angle */
         pairAlpha [pair] [band] = newAlpha;
         /* set previous angles according to mctMask */
         if (mctMask [pair] [band] > 0) {
            alpha_prev_frame [pair] [band%mctBandsPerWindow] = newAlpha;
         }
         else {
            alpha_prev_frame [pair] [band%mctBandsPerWindow] = DEFAULT_ALPHA;
         }
      }
      alpha_prev_fullband [pair] = newAlpha;
      for (band=bandsPerWindow ; band<MAX_NUM_MC_BANDS; band++) {
         alpha_prev_frame [pair] [band] = DEFAULT_ALPHA;
      }
}
```

For decoding the prediction coefficients for non-bandwise KLT angles the following c-code can be used.

```
for (pair=0; pair<numPairs; pair++) {
   mctBandsPerWindow = numMaskBands [pair] /windowsPerFrame;
   for (band=0; band<numMaskBands [pair]; band++) {
      if (delta_code_time [pair] > 0) {
         lastVal = alpha_prev_frame [pair] [band%mctBandsPerWindow];
      }
      else {
         if ((band % mctBandsPerWindow) = = 0) {
            lastVal = DEFAULT_ALPHA;
         }
      }
      if (msMask [pair] [band] > 0 ) {
         newAlpha = lastVal + dpcm_alpha [pair] [band] ;
         if(newAlpha > = 64)
            newAlpha -= 64;
         }
         pairAlpha [pair] [band] = newAlpha;
         alpha_prev_frame [pair] [band%mctBandsPerWindow] = newAlpha;
         lastVal = newAlpha;
      }
      else {
         alpha_prev_frame [pair] [band%mctBandsPerWindow] = DEFAULT_ALPHA; /*
-45° */
      }
      /* reset fullband angle */
      alpha_prev_fullband [pair ] = DEFAULT_ALPHA;
   }
   for (band=bandsPerWindow ; band<MAX_NUM_MC_BANDS; band++) {
      alpha_prev_frame [pair] [band] = DEFAULT_ALPHA;
   }
}
```

To avoid floating point differences of trigonometric functions on different platforms, the following lookup-tables for converting angle indices directly to sin/cos shall be used:

```
tabIndexToSinAlpha [64] = {
-1.000000f, -0.998795f, -0.995185f, -0.989177f, -0.980785f,
-0.970031f, -0.956940f, -0.941544f,
-0.923880f, -0.903989f, -0.881921f, -0.857729f, -0.831470f,
-0.803208f, -0.773010f, -0.740951f,
```

-continued

```
-0.707107f, -0.671559f, -0.634393f, -0.595699f, -0.555570f,
-0.514103f, -0.471397f, -0.427555f,
-0.382683f, -0.336890f, -0.290285f, -0.242980f, -0.195090f,
-0.146730f, -0.098017f, -0.049068f,
0.000000f, 0.049068f, 0.098017f, 0.146730f, 0.195090f, 0.242980f,
0.290285f, 0.336890f,
0.382683f, 0.427555f, 0.471397f, 0.514103f, 0.555570f, 0.595699f,
0.634393f, 0.671559f,
0.707107f, 0.740951f, 0.773010f, 0.803208f, 0.831470f, 0.857729f,
0.881921f, 0.903989f,
```

```
0.923880f, 0.941544f, 0.956940f, 0.970031f, 0.980785f, 0.989177f,
0.995185f, 0.998795f
};
tabIndexToCosAlpha [64] = {
0.000000f, 0.049068f, 0.098017f, 0.146730f, 0.195090f, 0.242980f,
0.290285f, 0.336890f,
0.382683f, 0.427555f, 0.471397f, 0.514103f, 0.555570f, 0.595699f,
0.634393f, 0.671559f,
0.707107f, 0.740951f, 0.773010f, 0.803208f, 0.831470f, 0.857729f,
0.881921f, 0.903989f,
0.923880f, 0.941544f, 0.956940f, 0.970031f, 0.980785f, 0.989177f,
0.995185f, 0.998795f,
```

```
1.000000f, 0.998795f, 0.995185f, 0.989177f, 0.980785f, 0.970031f,
0.956940f, 0.941544f,
0.923880f, 0.903989f, 0.881921f, 0.857729f, 0.831470f, 0.803208f,
0.773010f, 0.740951f,
0.707107f, 0.671559f, 0.634393f, 0.595699f, 0.555570f, 0.514103f,
0.471397f, 0.427555f,
0.382683f, 0.336890f, 0.290285f, 0.242980f, 0.195090f, 0.146730f,
0.098017f, 0.049068f
};
```

For decoding of multi-channel coding the following c-code can be used for the KLT rotation based approach.

```
decode_mct_rotation( )
{
  for (pair=0; pair < self->numPairs; pair++) {
  mctBandOffset = 0;
  /* inverse MCT rotation */
  for (win = 0, group = 0; group <num_window_groups; group++) {
    for (groupwin = 0; groupwin < window_group_length[group]; groupwin++,
win++) {
      *dmx = spectral_data [ch1] [win];
      *res = spectral_data [ch2] [win];
      apply_mct_rotation_wrapper (self,dmx,res,&alphaSfb[mctBandOffset],
&mctMask [mctBandOffset],mctBandsPerWindow, alpha,
                              totalSfb,pair,nSamples);
      }
      mctBandOffset += mctBandsPerWindow;
    }
  }
}
```

For bandwise processing the following c-code can be used.

```
apply_mct_rotation_wrapper (self, *dmx, *res, *alphaSfb, *mctMask,
mctBandsPerWindow,
                        alpha, totalSfb, pair, nSamples)
{
  sfb = 0;
  if (self->MCCSignalingType == 0) {
  }
  else if (self->MCCSignalingType == 1) {
    /* apply fullband box */
    if (!self->bHasBandwiseAngles [pair] && !self->bHasMctMask [pair] ) {
      apply_mct_rotation (dmx, res, alphaSfb [0], nSamples);
    }
    else {
      /* apply bandwise processing */
      for (i = 0; i< mctBandsPerWindow; i++) {
        if (mctMask [i] == 1) {
          startLine = swb_offset [sfb];
          stopLine = (sfb+2<totalSfb) ? swb_offset [sfb+2] : swb_offset
[sfb+1];
          nSamples = stopLine-startLine;
          apply_mct_rotation (&dmx [startLine] , &res [startLine] ,
alphaSfb [i], nSamples);
        }
        sfb += 2;
        /* break condition */
        if (sfb >= totalSfb) {
          break;
        }
      }
    }
  }
  else if (self->MCCSignalingType == 2) {
  }
  else if (self->MCCSignalingType == 3) {
    apply_mct_rotation (dmx, res, alpha, nSamples);
  }
}
```

For an application of KLT rotation the following c-code can be used.

```
apply_mct_rotation (*dmx, *res, alpha, nSamples)
{
  for (n=0;n<nSamples;n++) {
     L = dmx [n] * tabIndexToCosAlpha [alphaIdx] − res[n] *
tabIndexToSinAlpha [alphaIdx];
     R = dmx [n] * tabIndexToSinAlpha [alphaIdx] + res[n] *
tabIndexToCosAlpha [alphaIdx];
     dmx [n] = L;
     res [n] = R;
  }
}
```

Figure 5:
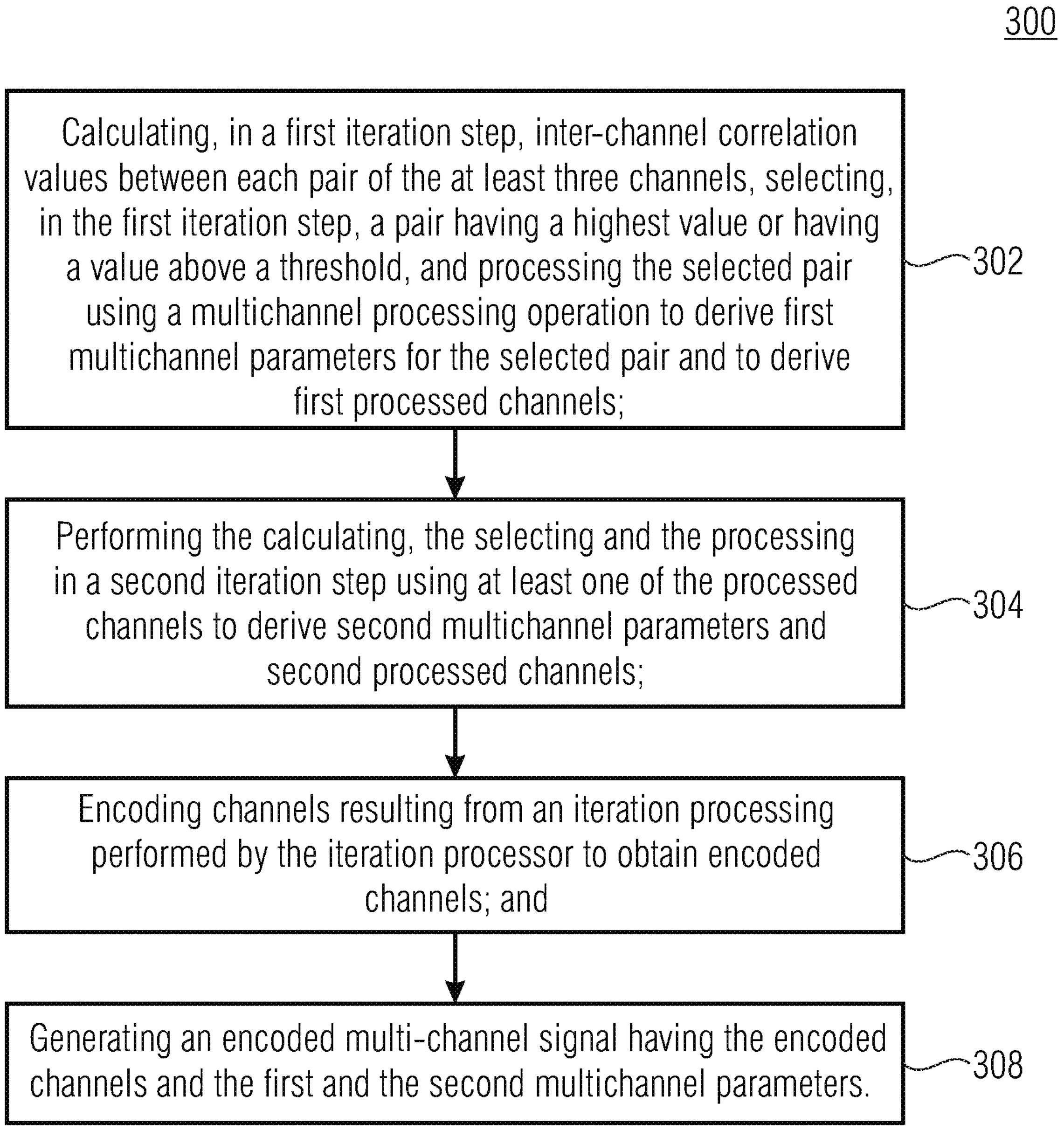
FIG. 5 shows a flowchart of a method for encoding a multi-channel signal having at least three channels, according to an embodiment.

FIG. 5 shows a flowchart of a method 300 for encoding a multi-channel signal having at least three channels. The method 300 comprises a step 302 of calculating, in a first iteration step, inter-channel correlation values between each pair of the at least three channels, selecting, in the first iteration step, a pair having a highest value or having a value above a threshold, and processing the selected pair using a multichannel processing operation to derive first multichannel parameters for the selected pair and to derive first processed channels; a step 304 of performing the calculating, the selecting and the processing in a second iteration step using at least one of the processed channels to derive second multichannel parameters and second processed channels; a step 306 of encoding channels resulting from an iteration processing performed by the iteration processor to obtain encoded channels; and a step 308 of generating an encoded multi-channel signal having the encoded channels and the first and the second multichannel parameters.

Figure 6:
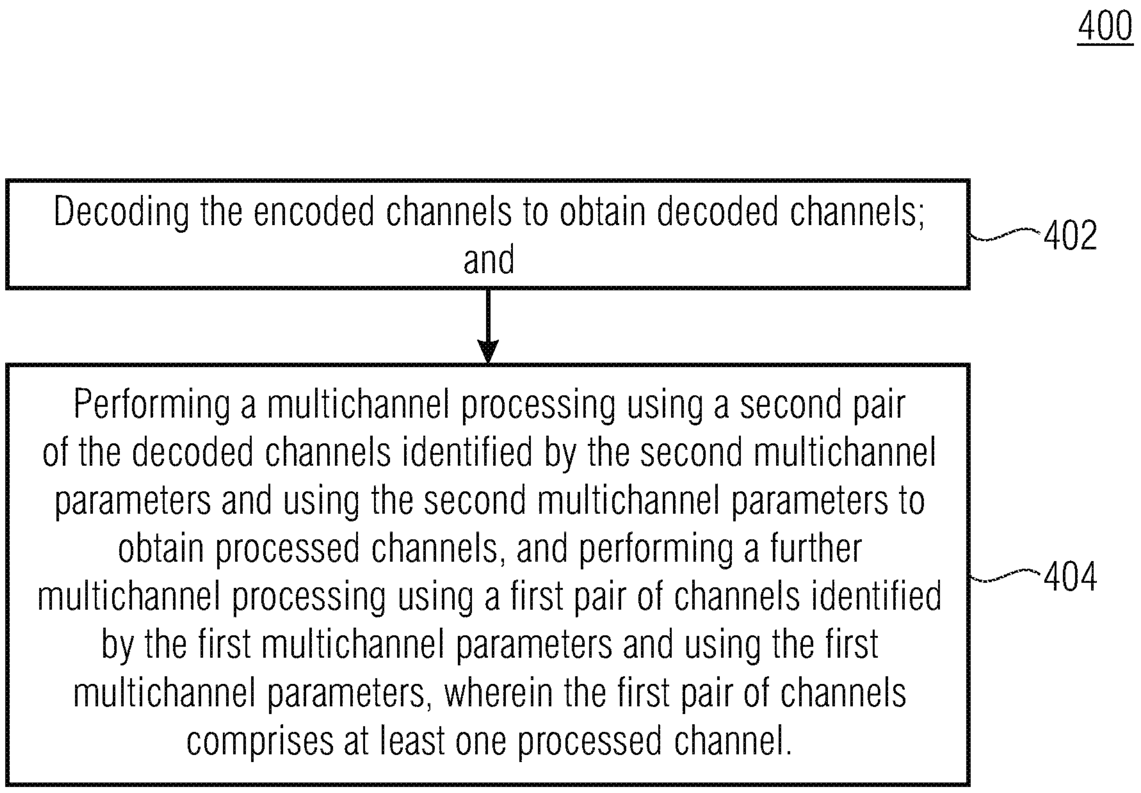
FIG. 6 shows a flowchart of a method for decoding an encoded multi-channel signal having encoded channels and at least first and second multi-channel parameters, according to an embodiment.

FIG. 6 shows a flowchart of a method 400 for decoding an encoded multi-channel signal having encoded channels and at least first and second multichannel parameters. The method 400 comprises a step 402 of decoding the encoded channels to obtain decoded channels; and a step 404 of performing a multichannel processing using a second pair of the decoded channels identified by the second multichannel parameters and using the second multichannel parameters to obtain processed channels, and performing a further multichannel processing using a first pair of channels identified by the first multichannel parameters and using the first multichannel parameters, wherein the first pair of channels comprises at least one processed channel.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

Embodiments provide an apparatus, method or computer program as described herein wherein multichannel processing means joint stereo processing or joint processing of more than two channels, and wherein a multichannel signal has two channels or more than two channels.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Audio encoder for encoding an multi-channel audio signal comprising at least three channels, comprising:

an iteration processor for calculating, in a first iteration step, inter-channel correlation values between each pair of the at least three channels, for selecting, in the first iteration step, a pair comprising a highest value or comprising a value above a threshold, and for processing the selected pair using a multichannel processing operation to derive first multichannel parameters for the selected pair and to derive first processed channels, wherein the iteration processor is configured to perform the calculating, the selecting and the processing in a second iteration step using at least one of the processed channels to derive second multichannel parameters and second processed channels;

a channel encoder for encoding channels resulting from an iteration processing performed by the iteration processor to acquire encoded channels; and an output interface for generating an encoded multi-channel audio signal comprising the encoded channels and the first and the second multichannel parameters, wherein the iteration processor is configured to derive, for a first frame, a plurality of selected pair indications, and wherein the output interface is configured to comprise, into the multi-channel audio signal, for a second frame, following the first frame, a keep indicator, indicating that the second frame comprises the same plurality of selected pair indications as the first frame.

2. Audio encoder of claim 1, wherein the output interface is configured to generate the encoded multi-channel audio signal as a serial bitstream and so that the second multichannel parameters are in the encoded signal before the first multichannel parameters.

3. Audio encoder of claim 1, wherein the iteration processor is configured to perform stereo processing comprising at least one of a group comprising rotation processing using a rotation angle calculation from the selected pair and prediction processing.

4. Audio encoder of claim 1, wherein the first multichannel parameters comprise a first identification of the channel in the selected pair for the first iteration step, and wherein the second multichannel parameters comprise a second identification of the channels in a selected pair of the second iteration step.

5. Audio encoder of claim 1, wherein the iteration processor is configured to calculate an inter-channel correlation using a frame of each channel comprising a plurality of bands so that a single inter-channel correlation value for the plurality of bands is acquired, and wherein the iteration processor is configured to perform the multichannel processing for each of the plurality of bands so that the first or the second multichannel parameters are acquired for each of the plurality of bands.

6. Audio encoder of claim 1, wherein the iteration processor is configured to only select a pair when the level difference of the pair is smaller than a threshold, the threshold being smaller than 40 dB, or 25 dB, or 12 dB, or smaller than 6 dB.

7. Audio encoder of claim 1, wherein the iteration processor is configured to calculate normalized correlation values, and wherein the iteration processor is configured to select a pair, when the correlation value is greater than 0.2 and advantageously 0.3.

8. Audio encoder of claim 1, wherein the iteration processor is configured to calculate stereo parameters in the multichannel processing, and wherein the iteration processor is configured to only perform a stereo processing in bands, in which a stereo parameter is higher than a quantized-to-zero-threshold defined by a stereo parameter quantizer.

9. Audio encoder of claim 1, wherein the iteration processor is configured to calculate rotation angles in the multichannel processing, and wherein the iteration processor is configured to only perform rotation processing in bands, in which a rotation angle is higher than a decoder-side dequantized-to-zero-threshold.

10. Audio encoder of claim 1, wherein the iteration processor is configured to not select the selected pair of the first iteration step in the second iteration step and, if applicable, in any further iteration steps.

11. Audio encoder of claim 1, wherein the iteration processor is configured to perform iteration steps until an iteration termination criterion is reached, wherein the iteration termination criterion is that a maximum number of iteration steps is equal to or higher than a total number of channels of the multi-channel audio signal by two, or wherein the iteration termination criterion is, when the inter-channel correlation values do not comprise a value greater than the threshold.

12. Audio encoder of claim 1, wherein the iteration processor is configured to process, in the first iteration step, the selected pair using the multichannel processing such that the processed channels are a mid-channel and a side-channel; and wherein the iteration processor is configured to perform the calculating, the selecting and the processing in the second iteration step using only the mid-channel of the processed channels as the at least one of the processed channels to derive the second multichannel parameters and second processed channels.

13. Audio encoder of claim 1, wherein the channel encoder comprises channel encoders for encoding the channels resulting from the iteration processing, wherein the channel encoders are configured to encode the channels so that less bits are used for encoding a channel comprising less energy than for encoding a channel comprising more energy.

14. Audio encoder of claim 1, wherein multichannel processing means a joint stereo processing or a joint processing of more than two channels, and wherein a multichannel signal comprises two channels or more than two channels.

15. Audio decoder for decoding an encoded multi-channel audio signal comprising encoded channels and at least first and second multichannel parameters, comprising:

a channel decoder for decoding the encoded channels to acquire decoded channels; and a multichannel processor for performing a multichannel processing using a second pair of the decoded channels identified by the second multichannel parameters and using the second multichannel parameters to acquire processed channels, and for performing a further multichannel processing using a first pair of channels identified by the first multichannel parameters and using the first multichannel parameters, wherein the first pair of channels comprises at least one processed channel, wherein the encoded multi-channel audio signal comprises, for a first frame, the first and the second multichannel parameters and, for a second frame, following the first frame, a keep indicator, and wherein the multichannel processor is configured to perform the multichannel processing and the further multichannel processing in the second frame to the same second pair and the same first pair of channels as used in the first frame.

16. Audio decoder of claim 15, wherein the multichannel processing and the further multichannel processing comprise a stereo processing using a stereo parameter, wherein for individual scale factor bands or groups of scale factor bands of the decoded channels, a first stereo parameter is comprised by the first multichannel parameter and a second stereo parameter is comprised by the second multichannel parameter.

17. Audio decoder of claim 15, wherein the first or the second multichannel parameters comprise a multichannel processing mask indicating which scale factor bands are multichannel processed and which scale factor bands are not multichannel processed, and wherein the multichannel processor is configured to not perform the multichannel processing in the scale factor bands indicated by the multichannel processing mask.

18. Audio decoder of claim 15, wherein the first and the second multichannel parameters each comprise a channel pair identification, and wherein the multichannel processor is configured to decode the channel pair identifications using a predefined decoding rule or a decoding rule indicated in the encoded multi-channel audio signal.

19. Audio decoder of claim 18, wherein the decoding rule is a Huffman decoding rule and wherein the multichannel processor is configured to perform a Huffman decoding of the channel pair identifications.

20. Audio decoder of claim 15, wherein the encoded multi-channel audio signal comprises a multichannel processing allowance indicator indicating only a sub-group of the decoded channels, for which the multichannel processing is allowed and indicating at least one decoded channel for which the multichannel processing is not allowed, and wherein the multichannel processor is configured for not performing any multichannel processing for the at least one decoded channel, for which the multichannel processing is not allowed as indicated by the multichannel processing allowance indicator.

21. Audio decoder of claim 15, wherein the first and second multichannel parameters comprise stereo parameters, and wherein the stereo parameters are differentially encoded, and wherein the multichannel processor comprises a differential decoder for differentially decoding the differentially encoded stereo parameters.

22. Audio decoder of claim 15, wherein the encoded multi-channel audio signal is a serial signal, wherein the second multichannel parameters are received, at the decoder, before the first multichannel parameters, and wherein the multichannel processor is configured to process the decoded channels in an order, in which the multichannel parameters are received by the decoder.

23. Audio decoder of claim 15, wherein multichannel processing means a joint stereo processing or a joint processing of more than two channels, and wherein a multichannel signal comprises two channels or more than two channels.

24. Audio encoding method for encoding a multi-channel audio signal comprising at least three channels, comprising:

Calculating, in a first iteration step, inter-channel correlation values between each pair of the at least three channels, selecting, in the first iteration step, a pair comprising a highest value or comprising a value above a threshold, and processing the selected pair using a multichannel processing operation to derive first multichannel parameters for the selected pair and to derive first processed channels, Performing the calculating, the selecting and the processing in a second iteration step using at least one of the processed channels to derive second multichannel parameters and second processed channels;

Encoding channels resulting from an iteration processing performed by the iteration processor to acquire encoded channels; and generating an encoded multi-channel audio signal comprising the encoded channels and the first and the second multichannel parameters, deriving, for a first frame, a plurality of selected pair indications, and including, into the multi-channel signal, for a second frame, following the first frame, a keep indicator, indicating that the second frame has the same plurality of selected pair indications as the first frame.

25. Audio decoding method of decoding an encoded multi-channel audio signal comprising encoded channels and at least first and second multichannel parameters, comprising:

decoding the encoded channels to acquire decoded channels; and performing a multichannel processing using a second pair of the decoded channels identified by the second multichannel parameters and using the second multichannel parameters to acquire processed channels, and performing a further multichannel processing using a first pair of channels identified by the first multichannel parameters and using the first multichannel parameters, wherein the first pair of channels comprises at least one processed channel, wherein the encoded multi-channel signal comprises, for a first frame, the first and the second multichannel parameters and, for a second frame, following the first frame, a keep indicator, and wherein the multichannel processing and the further multichannel processing in the second frame is performed on the same second pair and the same first pair of channels as used in the first frame.

26. Non-transitory digital storage medium having a computer program stored thereon to perform the audio encoding method for encoding a multi-channel audio signal comprising at least three channels, comprising:

Calculating, in a first iteration step, inter-channel correlation values between each pair of the at least three channels, selecting, in the first iteration step, a pair comprising a highest value or comprising a value above a threshold, and processing the selected pair using a multichannel processing operation to derive first multichannel parameters for the selected pair and to derive first processed channels, Performing the calculating, the selecting and the processing in a second iteration step using at least one of the processed channels to derive second multichannel parameters and second processed channels;

Encoding channels resulting from an iteration processing performed by the iteration processor to acquire encoded channels; and generating an encoded multi-channel audio signal comprising the encoded channels and the first and the second multichannel parameters, deriving, for a first frame, a plurality of selected pair indications, and including, into the multi-channel signal, for a second frame, following the first frame, a keep indicator, indicating that the second frame has the same plurality of selected pair indications as the first frame, when said computer program is run by a computer.

27. Non-transitory digital storage medium having a computer program stored thereon to perform the audio decoding method of decoding an encoded multi-channel audio signal comprising encoded channels and at least first and second multichannel parameters, comprising:

decoding the encoded channels to acquire decoded channels; and performing a multichannel processing using a second pair of the decoded channels identified by the second multichannel parameters and using the second multichannel parameters to acquire processed channels, and performing a further multichannel processing using a first pair of channels identified by the first multichannel parameters and using the first multichannel parameters, wherein the first pair of channels comprises at least one processed channel, wherein the encoded multi-channel signal comprises, for a first frame, the first and the second multichannel parameters and, for a second frame, following the first frame, a keep indicator, and wherein the multichannel processing and the further multichannel processing in the second frame is performed on the same second pair and the same first pair of channels as used in the first frame, when said computer program is run by a computer.

* * * * *